L. Marble,
Washing Machine.

Nº 46686. Patented Mar. 7, 1865.

Witnesses:
Wm. P. McNamara
J. P. Hall

Inventor:
Lansing Marble
per Munn & Co.
Attorneys

UNITED STATES PATENT OFFICE.

LANSING MARBLE, OF VASSAR, MICHIGAN.

IMPROVED WASHING-MACHINE.

Specification forming part of Letters Patent No. 46,686, dated March 7, 1865.

*To all whom it may concern:*

Be it known that I, LANSING MARBLE, of Vassar, in the county of Tuscola and State of Michigan, have invented a new and Improved Clothes Washing and Wringing Machine; and I do hereby declare that the following is a full, clear, and exact description thereof, which will enable others skilled in the art to make and use the same, reference being had to the accompanying drawings, forming a part of this specification, in which—

Figure 1:
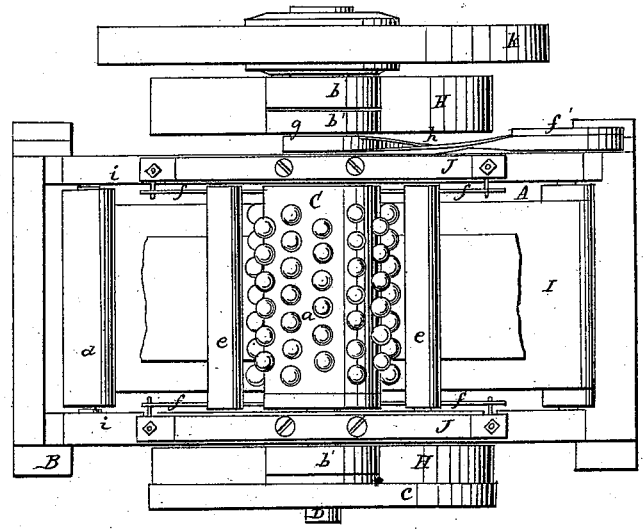
Figure 2:
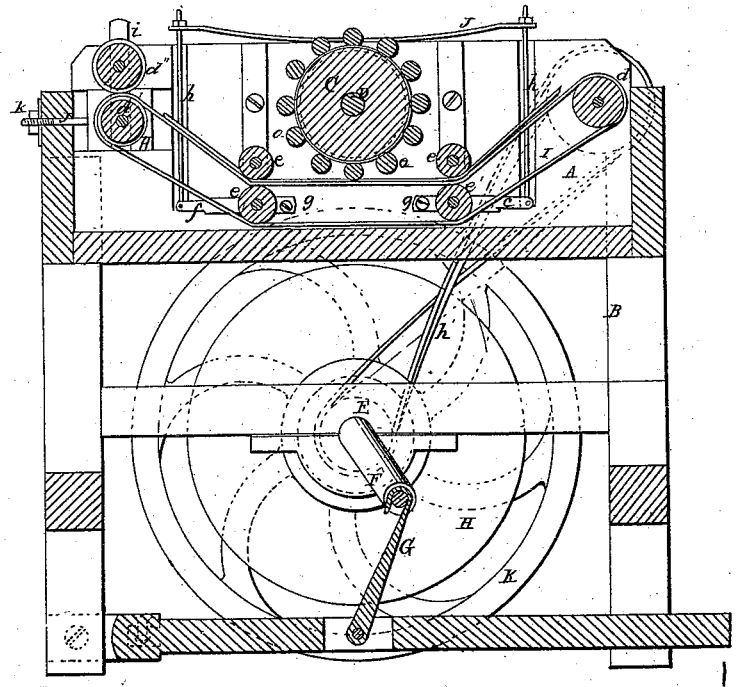

Figure 1 is a plan or top view of my invention; Fig. 2, a side sectional view of the same, taken through the center.

Similar letters of reference indicate like parts.

This invention consists in the employment or use of a cylinder provided at its periphery with balls or spheres placed in rows parallel with the axis of the cylinder, in connection with an endless belt and rollers, all arranged within a suds-box, to operate in the manner hereinafter fully set forth.

A represents a suds-box supported by a suitable framing, B, and having a cylinder, C, placed transversely in it, the periphery of the latter being provided with balls or spheres $a$, arranged in rows which are parallel with the axis of cylinder C, as shown in Fig. 1. The balls or spheres $a$ may be of metal cast on the ends of screws. I do not, however, confine myself to any particular material. The axis or shaft D of the cylinder C extend through the sides of the suds-box, and has a fast and loose pulley, $b\ b'$, on each end of it.

E is the driving-shaft, placed transversely in the framing B, below the suds-box, and provided at its center with a crank, F, to which a treadle, G, is connected by a rod, G'. The shaft E has a pulley, H, on each end of it, around which and the pulleys $b'$, on the cylinder shaft D belts $c$ pass.

I is an endless belt placed in the suds-box A, and working around rollers $d\ d'$, one at each end of the suds-box, at its upper part. This belt I also passes underneath two fixed rollers, $e\ e$, which are on a level with the lower part of the cylinder C, and also underneath the two rollers $e'\ e'$, the axis of which have their bearings in arms $f\ f$, secured to the sides of the suds-box by pivots $g$, and connected at their outer ends by rods $h$, which pass upward at each side of the suds-box, and are connected to the ends of springs J J on the upper surfaces of the sides of the suds-box. The springs J J have a tendency to keep the upper part of the belt I in contact with the rollers $e\ e$, as will be understood by referring to Fig. 2.

The rollers $e\ e\ e'\ e'$ are arranged in pairs, one being placed over the other in the same axial plan, as shown in Fig. 2.

The roller $d$ of the endless belt I has its shaft extending through one side of the suds-box A, and has a pulley, $f'$, upon it, around which and a pulley, $g$, on the shaft E, a belt, $h'$, passes. The other roller, $d'$, of the endless belt I has its bearings in upright bars $i\ i$, which are attached to slides K, fitted in grooves in the sides of the suds-box, and having screws $j$ attached to them, which pass through the end of the suds-box, and have nuts $k$ on their outer ends, by turning which the roller $d'$ may be adjusted to tighten the belt I as required.

Directly over the roller $d'$ there is a similar roller, $d''$, the axis of which has its bearings in the bars $i\ i$. This roller $d''$ forms a wringing attachment.

From the above description it will be seen that as the shaft E is rotated motion will be communicated to the cylinder C, through the medium of the belts $c$, and the endless belt I will be moved through the medium of the belt $h'$. The clothes to be operated upon are placed on the belt I, and are acted upon between the cylinder C and the belt, I the clothes being moved back and forth underneath the cylinder by reversing the movement of the shaft E. The balls or spheres $a$ admit of the suds being thrown sidewise or laterally, as well as longitudinally, and the clothes are acted upon in a thorough manner, and without being injured or torn, the belt supporting the clothes, and at the same time being allowed to yield or give, owing to the arrangement of the rollers $e'\ e'$, levers $f$, and springs J.

The clothes are wrung by passing them underneath the roller $d''$. The box A is supplied with a requisite amount of suds at the commencement of the washing operation, and at one end of the shaft E there is a fly-wheel, K.

Having thus described my invention, I claim as new and desire to secure by Letters Patent—

The cylinder C, provided with the balls or spheres $a$ at its pheriphery, in combination with the endless apron I, arranged in connection with the fixed rollers $e\ e$ and movable or adjustable rollers $e'\ e'$, all arranged to operate substantially as and for the purpose herein set forth.

LANSING MARBLE.

Witnesses:
WILLIAM LAKE, Sr.,
WM. LAKE, Jr.